US008738967B2

(12) United States Patent
Kube et al.

(10) Patent No.: US 8,738,967 B2
(45) Date of Patent: *May 27, 2014

(54) SYSTEM AND METHOD FOR GRAMMAR BASED TEST PLANNING

(71) Applicant: Wurldtech Security Technologies, Vancouver (CA)

(72) Inventors: Nathan John Walter Kube, Vancouver (CA); Daniel Hoffman, Victoria (CA); Kevin Yoo, West Vancouver (CA)

(73) Assignee: Wurldtech Security Technologies, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,378

(22) Filed: Jul. 12, 2013

(65) Prior Publication Data
US 2014/0025994 A1    Jan. 23, 2014

Related U.S. Application Data

(63) Continuation of application No. 13/411,379, filed on Mar. 2, 2012, now Pat. No. 8,489,926, which is a continuation of application No. 12/395,235, filed on Feb. 27, 2009, now Pat. No. 8,132,053.

(60) Provisional application No. 61/032,043, filed on Feb. 27, 2008.

(51) Int. Cl.
*G06F 11/00* (2006.01)
(52) U.S. Cl.
USPC .................................. 714/32; 714/25; 714/1
(58) Field of Classification Search
USPC ............................................ 714/32, 25, 48
See application file for complete search history.

(56) References Cited

U.S. PATENT DOCUMENTS 5,724,273 A    3/1998  Desgrousilliers et al.
5,913,023 A    6/1999  Szermer
(Continued)

FOREIGN PATENT DOCUMENTS

CN         11094118 A      12/2007
WO     WO 2006/106502 A1   10/2006
WO     WO 2006/106502 A2   10/2006

OTHER PUBLICATIONS

Auguston, et al., Using Attributed Event Grammar Environment Models for Automated Test Generation and Software Risk Assessment of Systems-of-Systems, Systems, Man and Cybernetics, IEEE International Conference, Oct. 10-12, 2005, vol. 2, pp. 1870-1875.

(Continued)

*Primary Examiner* — Sarai Butler
(74) *Attorney, Agent, or Firm* — Knobbe Martens Olson & Bear LLP

(57) ABSTRACT

The present disclosure generally relates to the testing of a system that includes software or hardware components. In some embodiments, a testing framework generates a set of test cases for a system under test using a grammar. Each test case may perform an action, such as provide an input to the system under test, and result in an output from the system under test. The inputs and outputs are then compared to the expected results to determine whether the system under test is performing correctly. Prior to generating the set of test cases from the grammar, the testing framework processes the grammar to identify attributes of the test cases to be derived from the grammar and facilitates the modification of the grammar.

20 Claims, 5 Drawing Sheets

(56) References Cited

U.S. PATENT DOCUMENTS

| | | | |
|---|---|---|---|
| 6,125,457 | A | 9/2000 | Crisan et al. |
| 6,195,616 | B1 | 2/2001 | Reed et al. |
| 7,290,193 | B2 | 10/2007 | Kadkade et al. |
| 7,340,364 | B1 | 3/2008 | Kumaki |
| 7,343,587 | B2 | 3/2008 | Moulden, Jr. et al. |
| 7,480,900 | B1 | 1/2009 | Zhou et al. |
| 8,006,136 | B2 | 8/2011 | Kube et al. |
| 8,132,053 | B2 | 3/2012 | Kube et al. |
| 8,433,542 | B2 | 4/2013 | Kube et al. |
| 2001/0054174 | A1 | 12/2001 | Boggs et al. |
| 2003/0033404 | A1 | 2/2003 | Richardson et al. |
| 2003/0051163 | A1 | 3/2003 | Bidaud |
| 2006/0090100 | A1 | 4/2006 | Holzapfel et al. |
| 2006/0184928 | A1 | 8/2006 | Hughes |
| 2007/0220342 | A1* | 9/2007 | Vieira et al. ............ 714/33 |
| 2008/0059106 | A1 | 3/2008 | Wight et al. |
| 2008/0086660 | A1* | 4/2008 | Wefers ............ 714/37 |
| 2008/0115112 | A1 | 5/2008 | Sharma |
| 2008/0120521 | A1* | 5/2008 | Poisson et al. ............ 714/26 |
| 2008/0184206 | A1 | 7/2008 | Vikutan |

OTHER PUBLICATIONS

Bird, D.L., and C.U. Munoz, Automatic Generation of Random Self-Checking Test Cases, IBM Systems Journal, 1983, vol. 22, Issue 3, pp. 229-245.

Dalal, S.R., et al., Model-Based Testing of a Highly Programmable System, Proceedings of the Ninth Symposium on Software Reliability Engineering, Nov. 4-7, 1998, pp. 174-179.

Hanford, K.V., Automatic Generation of Test Cases, IBM Systems Journal 9(4):242-257, 1970.

Lammel, R., and W. Schulte, Controllable Combinatorial Coverage in Grammar-Based Testing, Proceedings of the 18th IFIP TC6/WG6.1 International Conference, TestCom, May 16-18, 2006, New York.

Sirer, E.G., and B.N. Bershad, Using Production Grammars in Software Testing, Second Conference on Domain Specific Languages, Austin, Texas, Oct. 3-5, 1999, pp. 1-13.

Using Attributed Event Grammar Environment Models for Automated Test Generation and Software Risk Assessment of System-of-Systems, Systems, Man and Cybernetics, IEEE International Conference, 2005, vol. 2, pp. 1870-1875.

* cited by examiner

SYSTEM AND METHOD FOR GRAMMAR BASED TEST PLANNING

CROSS-REFERENCE TO RELATED APPLICATIONS

This application is a continuation of U.S. patent application Ser. No. 13/411,379, entitled System and Method for Grammar Based Test Planning, and filed Mar. 2, 2012, which is a continuation of U.S. patent application Ser. No. 12/395,235 entitled System and Method for Grammar Based Test Planning, and filed Feb. 27, 2009, now U.S. Pat. No. 8,132,053, which claims the benefit of U.S. Provisional Application No. 61/032,043, entitled "System and Method for Grammar Based Test Planning," and filed Feb. 27, 2008, the entireties of which is incorporated herein by reference.

BACKGROUND

Generally described, computing devices can be utilized in a variety of contexts such as for exchanging information, facilitating communication between users, facilitating the operation and control of a wide variety devices and processes, and the like. In the context of a manufacturing or production environment, a computing network made up of a number of computing devices, including personal computing devices, server computing devices, programmable logic controllers (PLCs), and/or other networked devices can be utilized in conjunction with a communication network, such as the Internet, to facilitate the operation and control of various devices/processes. For example, a networked PLC may be utilized to control the operation of physical manufacturing or processing equipment, such as controllers for valves, power supplies, pumps, machinery, etc. Similarly, a software application, or suite of software applications, may be hosted on a networked computing device (such as a server or personal computing device) to receive instructions regarding the operation of various equipment and transmit the appropriate respective instructions to the appropriate equipment (such as through a PLC).

A fault in one or more networked computing devices, such a fault in a computing device, can lead to the failure of associated equipment, loss of manufacturing/production time, property damage, and the like. Accordingly, manufacturing/production computing networks (including hardware and software aspects) can be designed with redundant components to avoid fault conditions during execution in a manufacturing/production environment. For example, a PLC may include a "fail safe" mode such that in the event of a fault, the outputs from the PLC mitigate potential damage to attached equipment or errant instructions that could cause additional faults/damage.

Computing systems can be tested to verify that requirements for safety and redundancy are met and to discover errors in design/implementation. For example, a testing system can be implemented, such as in a laboratory, that attempts to emulate various commands, instructions, or other environmental information and then measure the response generated by the computing device(s) being tested. The emulated commands, instructions, or other environment information can be embodied as a test case or testing procedure that can be executed by a testing system.

One approach to the generation of test cases and/or testing procedures for computing device testing involves the utilization of testing framework that is in communication solely with the device under test. This approach, however, can be inefficient in recreating many of the inputs and/or operating environments associated with the device under test. For example, in a system under test including multiple networked computing devices, the testing framework would need to analyze inputs/outputs from each computing device in the system under test in order to accurately test the system. For example, a computing device in a system under test experiencing an error may still be generating an expected output coinciding with an output generated by the computing device entering a "fail safe" mode. However, in such a fail safe mode, the computing device would not be able to properly process inputs from a control computing device. Accordingly, current testing approaches can become deficient in properly assessing system under test performance as a function of a testing environment.

SUMMARY OF THE INVENTION

The present disclosure generally relates to the automated testing of a system that includes software or hardware components (referred to herein as the "system under test" or "device under test"). In some embodiments, a testing framework generates a set of test cases for a system under test using a grammar. Each test case may perform an action, such as provide an input to the system under test, and result in an output from the system under test. The inputs and outputs are then compared to the expected results to determine whether the system under test is performing correctly. For example, the testing framework can be used to monitor the digital inputs and/or outputs of a programmable logic controller (PLC) and/or determine whether the PLC is performing to its specified behavior. Specifically, the PLC may be analyzed to determine whether it is capable of properly processing control instructions and input signals and/or generating expected output control signals and additional control/feedback information. The data can then be interpreted in the grammar system and/or used as input to a fault isolation engine to determine anomalies in the system under test.

In an illustrative embodiment, the set of test cases can be managed within the testing framework to facilitate more efficient testing of the device under test. In such an embodiment, the testing framework can obtain an initial set of test cases that are defined in according to the grammar. The grammar can include one or more attributes or tags that correspond to different aspects of the set of test cases. Prior to deriving the set of test cases for the device under test, the testing framework can analyze the grammar corresponding to the initial set of test cases to identify attributes of what would be the resulting set of tests cases. The analysis can include a determination of a number and kind of test cases that would be derived without requiring the actual generation of the initial set of test cases. The resulting analysis can be presented to a user associated with the testing framework, such as via a graphical user interface. Based on the analysis, the grammar corresponding to the grammar corresponding to the initial set of test cases can be modified, such as by modifying one or more tags or attributes of the grammar. The resulting modified grammar can be used to generate a modified set of test cases. Alternatively, the testing framework can repeat the analysis process again to facilitate additional modification of the grammar.

BRIEF DESCRIPTION OF THE DRAWINGS

The present disclosure will now be described in detail below in connection with the following figures in which.

DETAILED DESCRIPTION OF THE PREFERRED EMBODIMENT

Figure 1A:
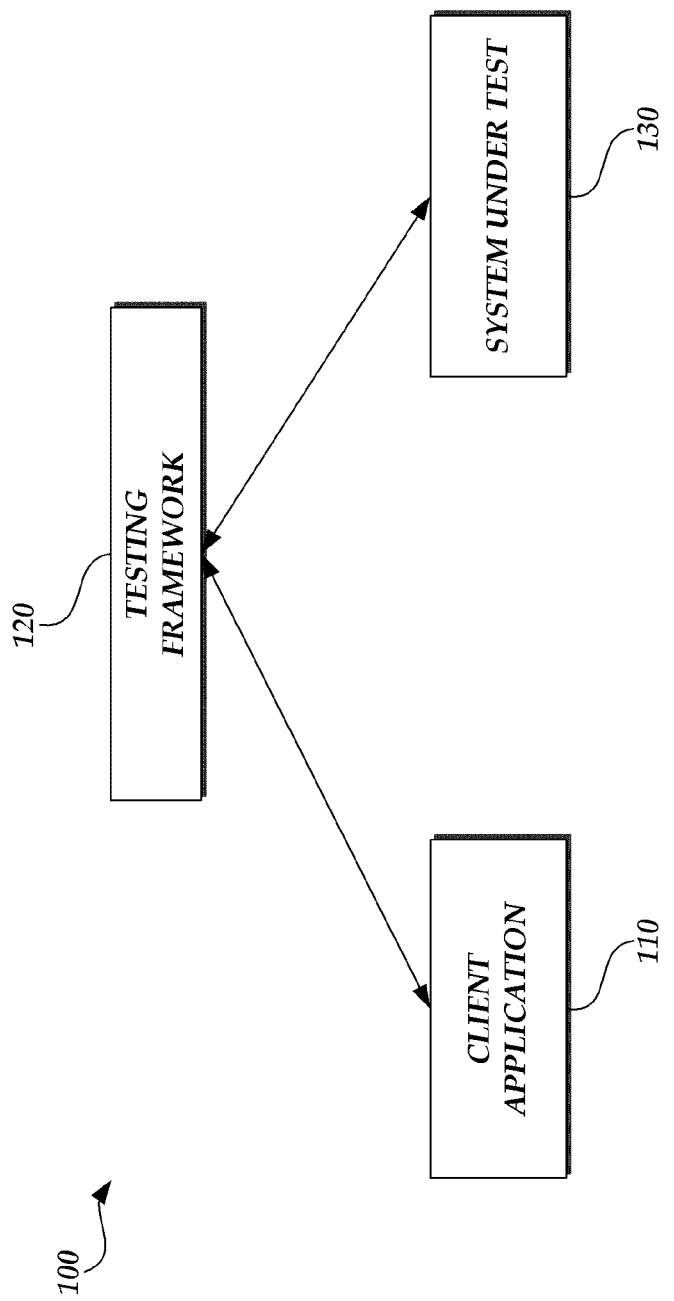
FIG. 1A illustrates a block diagram of an exemplary system capable of generating a set of test cases according to a grammar.

This disclosure generally relates to testing and testing frameworks. More specifically, it relates to systems and/or methods for providing a testing framework for a system under test. In some embodiments, the testing framework can be used to assess the robustness of process control devices through the monitoring of outputs from one or more components in a testing environment that are typically considered inputs to a system under test. Additionally, the testing framework can assess the robustness of process control devices through monitoring of outputs responsive to a testing sequence (e.g., a series of test cases) provided by the testing framework. The monitored outputs are generated by the system under test and collected by the testing framework.

In accordance with an illustrative embodiment, the system can be tested using a framework that automatically generates test cases using context free grammars. The grammars describe a set of test cases that can be utilized by the testing framework to generate a set of inputs to a system under test, or a device under test, to verify that such system under test or device under meets requirements or to detect errors in the system under test or device under test. In contrast to testing frameworks in which a set of test cases must be generated and processed, the testing framework can analyze an existing grammar to determine attributes or aspects of a set of test cases that would be derived from the grammar. Based on the result of the analysis, a new grammar can be generated by controlling grammar attribute tags of the previous grammar. The modification of the attribute tags results in the selection/creation of a subset of test cases generated by the previous version of the grammar or previous grammar. In an embodiment, the new set of grammars is automatically modified by the testing framework by inserting tags, otherwise modifying aspects, in an original grammar. In other aspects, the testing framework can facilitate a manual modification of the original grammar.

Once the set of test cases has been generated, the testing framework can be used to assess specific vulnerabilities and security threats to control system devices and networks. The present disclosure may be particularly beneficial for systems, such as process control and supervisory control and data acquisition (SCADA) systems, that have traditionally used closed proprietary architectures. However, one skilled in the relevant art will appreciate that the disclosed testing framework, operating environment, test cases, and grammars are illustrative in nature and should not be construed as limiting. Additionally, the present disclosure should not be construed to be applicable to any particular system under test or device under and that all disclosed embodiments are also illustrative in nature.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A illustrates a block diagram of an exemplary system 100 capable of initiating and processing a test sequence for a system under test. As shown, a client application 110 communicates with a testing framework 120. Testing framework 120 may communicate with system under test 130. Communication within the system may take place over a network using sockets, ports, and other mechanisms recognized in the art. In an illustrative embodiment, communication between the client application 110, the testing framework 120 and the system under test 130 may be facilitated through a standardized communication protocol, such as the Object-Linking and Embedding (OLE) for Process Control standard, generally referred to as "OPC." The communication may also be via wire(s), cable(s), flex circuit(s), wireless technologies, or other suitable analog or digital communication methodologies and devices to perform those methodologies. Client application 110, testing framework 120, and system under test 130 may reside on physically separate machines, such as computers, or be on the same machine. Still further, although client application 110 and testing framework 120 are illustrated in a client-server model, one skilled in the relevant art will appreciate that the system 100 may be implemented in a peer-to-peer network embodiment.

Client application 110 may be an application running on a computing device that allows a user to select configuration and test procedures to run on system under test 130. In an embodiment, where client application resides on a computer separate from testing framework 120, client application 110 may send data to testing framework 120 that specifies the user selected configuration and test procedures to run. In one aspect, client application 110 can obtain results from the testing framework 120 regarding analysis of a grammar prior to generation of a set of test cases derived from the grammar. Additionally, after tests have been run on system under test 130, client application 110 can receive results from testing framework 120 and generate reports based on the results. In an alternative embodiment, the client application 110 may be hosted as a network-provided service.

Testing framework 120 may be an application running on a computer server that generates and executes tests on system under test 130 based on the configuration and test procedures selected by the user with client application 110. For example, testing framework 120 can include a web service component running on a computer server or distributed across one or more computers and operative to exchange information via an application programming interface ("API"). When test results are received from system under test 130, testing framework 120 may refine a testing strategy and create a second set of tests that are broader or narrower than the original tests run on system under test 130.

System under test 130 may comprise a computer program, hardware device, and/or a combination of one or more hardware device(s) and computer program(s). For example, the system under test 130 can include an operating system or software application. In another example, the system under test 130 may be a hardware device, such as a programmable logic controller or supervisory control and data acquisition system. As previously discussed, the system under test 130 may be a combination of hardware or software components such as a computing device executing one or more computer programs. In some embodiments, the system under test 130 may be a database, user interface, computer network, and embedded or industrial device. One skilled in the relevant art will appreciate that additional or alternative configurations of the system under test 130 will be considered to be within the scope of the present disclosure. Additionally, although the system under test 130 is referred to as a computer system, the system under test may correspond to a single computing device or computer program.

Figure 1B:
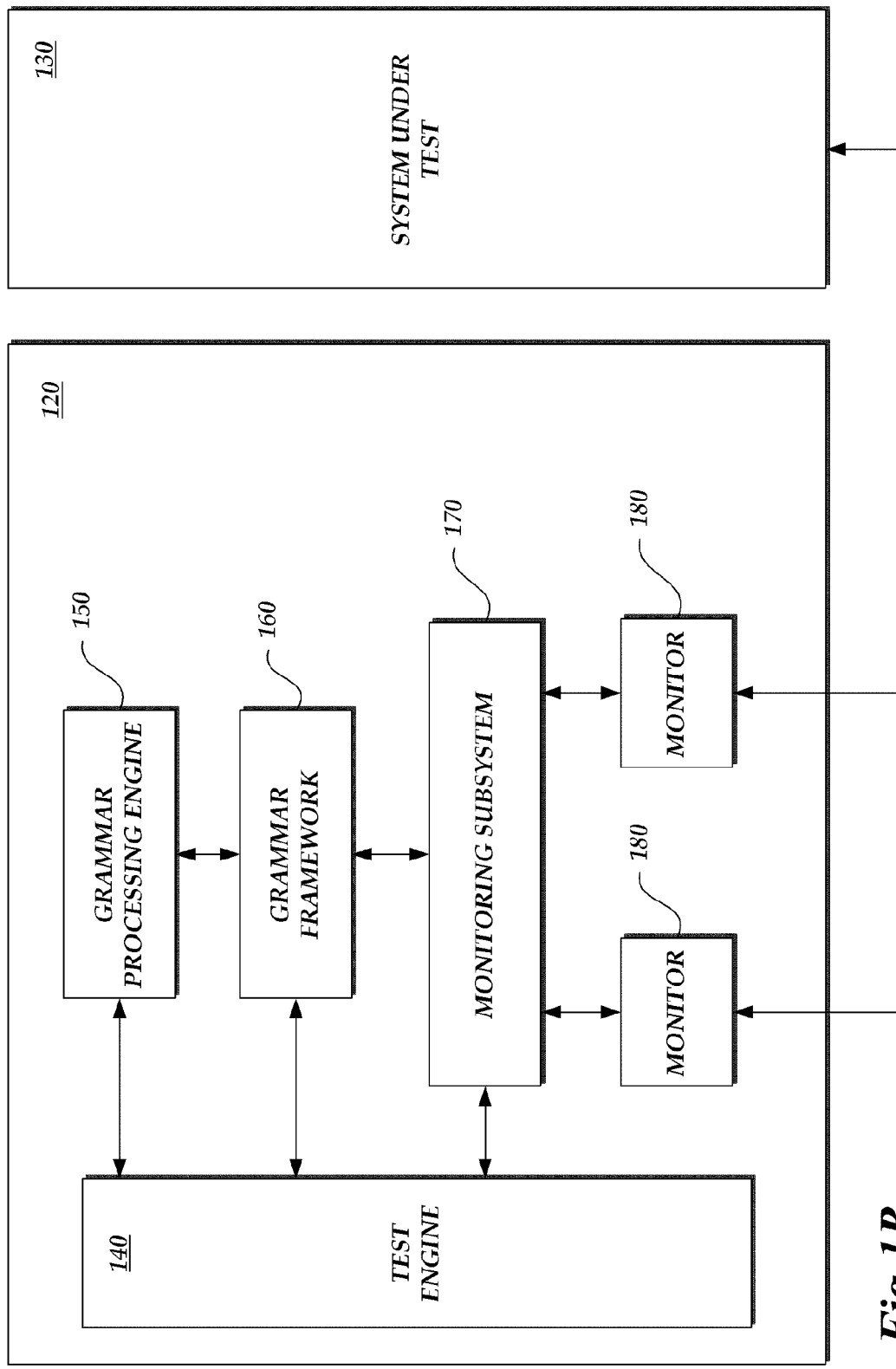
FIG. 1B illustrates exemplary components of the testing framework of FIG. 1A, according to an embodiment of the disclosure.

FIG. 1B illustrates exemplary components of testing framework 120, according to some embodiments of the disclosure. As depicted, testing framework 120 can include a test engine 140, a grammar processing engine 150, a grammar framework 160, and a monitoring subsystem 170. The test engine 140 may coordinate monitoring of the system under test 130, scheduling and managing of interdependencies between testing, launching of the tests, and recording of test results in, for example, a unified reporting structure.

Grammar processing engine 150 may receive results from tests run on system under test 130 from test engine 140. The results may include an actual output from system under test 130 that results from an input being applied to system under test 130. The actual output may be compared to an expected output to determine whether system under test 130 operates as expected. Grammar processing engine 150 can use the results to create a second (new) set of one or more grammars by modifying or inserting tags, attributes, or annotations into one or more grammars of the first (original) set of grammars according to different strategies. For example, grammar processing engine 150 may generate tag combinations that reveal faults. Further, grammar processing engine 150 can generate tags that reduce the total number of test cases generated by finding a smaller set of tags that reveal the already existing faults that have been exposed by the original set of grammars. Additionally, grammar processing engine 150 can perform a neighborhood search, by for example, generating grammars that create a new set of test cases near the original set of test cases.

The grammar framework 160 may typically include a grammar with attributes. The grammar with attributes may describe a set of one or more test cases. Of note, grammar framework 160 may parse the grammar and generate a set of test cases that can be run on the system under test 130. Further, grammar framework 160 can then execute the test cases on system under test 130. As shown, the results of the test cases can also be gathered by grammar framework 160 from system under test 130 to coordinate execution of the test cases.

As further illustrated, monitoring subsystem 170 receives results from executing the test cases on system under test 130. Monitoring subsystem 170 can then use one or monitors 180 to correlate results from the execution of test cases with, for example, the health or status of the system under test 130. This may be advantageous for understanding the effects of test cases on, for example, available memory, processing resources, network response time, and other specific process functionality of system under test 130. Further, monitoring subsystem 170 allows the results of tests to be interpreted in a reliable, repeatable, and affordable manner. Monitor 180 may use a variety of techniques to observe the environment or health of system under test 130 during testing, for example.

As shown, there may be one or more types of monitors. Additionally, there can be one or more instances of each type of monitor 180 in a test environment. Monitors 180 may also correspond to external software or hardware components for observing the system 100 or system under test 130.

In an exemplary embodiment, monitor 180 may receive output from system under test 130 in real time, for example. This may be particularly helpful where the system under test 130 is a device controller. In this situation, a device that is operated by system under test 130 may exhibit normal behavior in response to an erroneous input from system under test 130, often the result of the device entering a fail safe mode. As a result, it may be improperly assumed that system under test 130 is operating correctly as well. A monitor 180 that examines the output of system under test 130, such as step function, would expose this flawed assumption and can therefore be particularly advantageous for ascertaining whether the system under test 130 is actually functioning correctly. To determine whether the system under test 130 is performing as expected, for example, monitor 180 may compare the actual step function to an expected step function. A discrepancy between the step functions can indicate that a test case resulting from a grammar has exposed a fault of system under test 130.

Additionally, monitor 180 may be useful for determining network connectivity. For example, monitor 180 may determine whether system under test 130 is connected to a network or in communication with a device, such as a computer server running a component of testing framework 120. In this embodiment, monitor 180 may use internet control message protocol (ICMP) messages to determine whether the system under test 130 is connected to the network. Alternatively, monitor 180 can use an open connectivity interface to ascertain whether system under test 130 is communicating with other devices.

Figure 2:
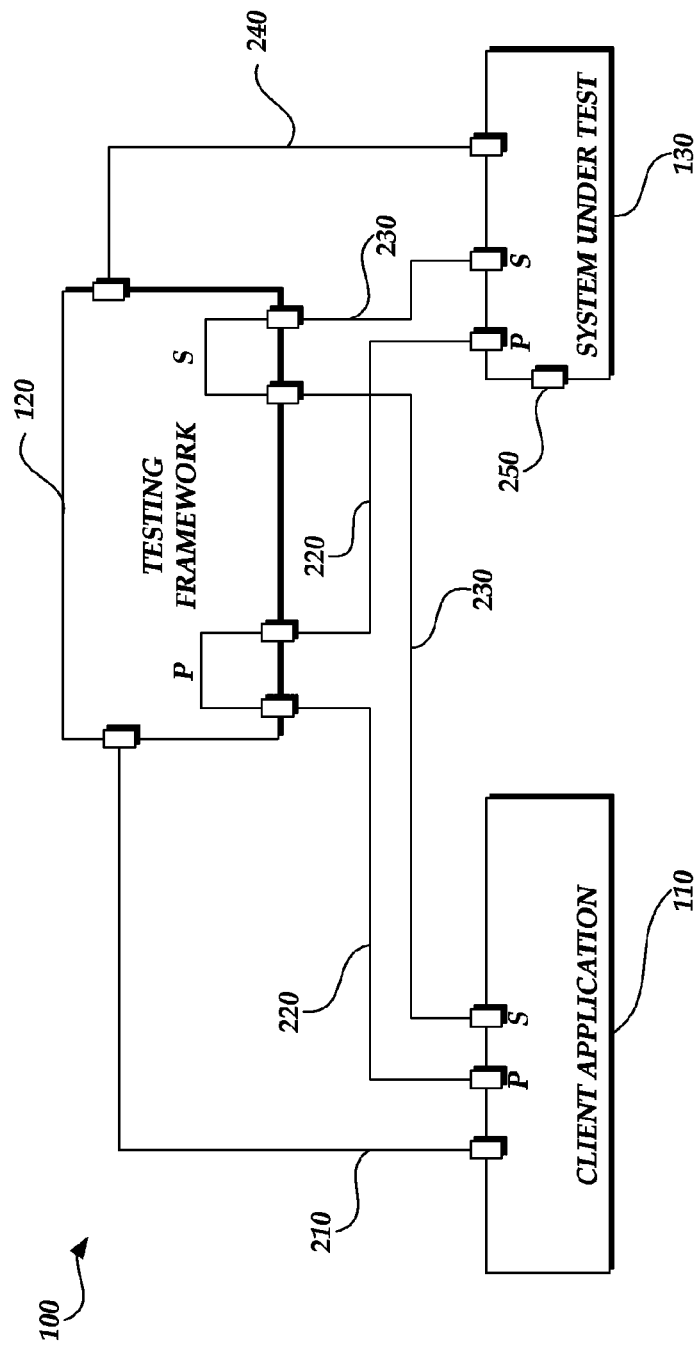
FIG. 2 illustrates a block diagram of the testing environment of FIG. 1 illustrating the interconnection of inputs and outputs the exemplary components of the systems of FIGS. 1A and 1B.

With reference now to FIG. 2, the interconnection of inputs and outputs the exemplary components of the systems of FIGS. 1A and 1B will be described. However, one skilled in the relevant art will appreciate that the interconnections shown in FIG. 2 are illustrative in nature and are not to be construed as limiting. As illustrated in FIG. 2, the client application 110 (FIG. 1A) includes a first output corresponding a control signal generated by the client application. In an illustrative embodiment, the control signal corresponds to commands or other input generated by the client application 110 for implementing a testing sequence. The commands can be in accordance with the OPC communication standard.

The client application 110 also includes a primary output 220 and secondary output 230 for generating outputs to the system under test 130. As illustrated in FIG. 2, the primary and secondary output signals pass through the testing framework 120. In this capacity, the testing framework 120 serves as a communication bridge and can modify the input signals.

With continued reference to FIG. 2, the system under test 130 also includes various outputs 240 and 250 which can be routed to the testing framework 130. For example, output 240 can correspond to a square wave output that can be monitored by the testing framework 130. Output 250 can correspond to USB interfaces for debugging by the client application 110 or other computing device. Output 250 can also correspond to an RS232 data interface for serially communicating additional information regarding the system under test 130.

Figure 3:
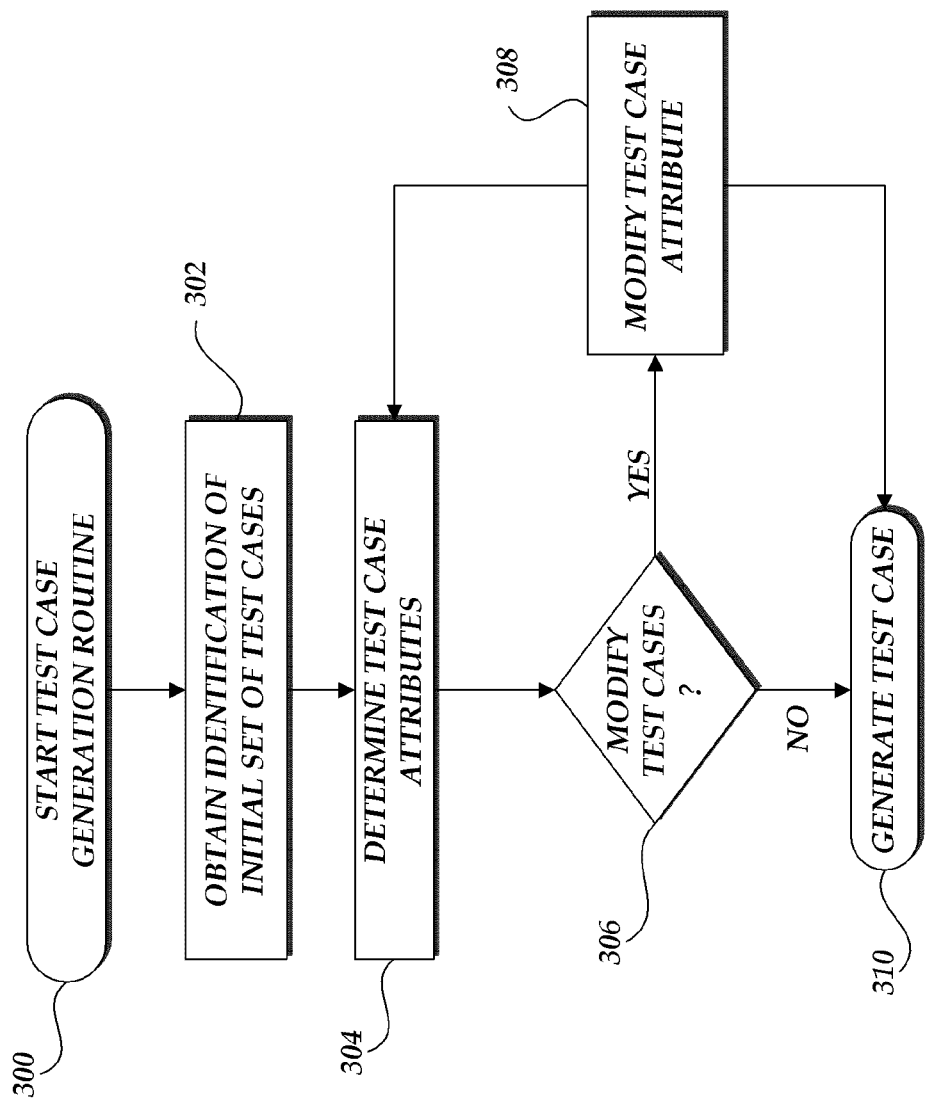
FIG. 3 illustrates a flow diagram illustrative of test case generation routine implemented with a testing framework.

With reference now to FIG. 3, a routine 300 implemented by a testing framework 120 for generating a set of test cases will be described. At block 302, the testing framework obtains an identification of an initial set of test cases. In an illustrative embodiment, the initial set of test cases is defined in accordance with various attributes or tags of a testing grammar. With tagged grammars, a short grammar can describe a very large, often infinite, set of elements. The grammar tags can be set to selectively reduce the size of the grammar's language. In automated testing, the grammars can be written so that each generated element is a test case. This approach has been effective for a variety of testing tasks. In an illustrative embodiment, the grammar can comprise a list of rules. Each rule can be made up of terminals (quoted strings) and/or non-terminals (variable names). A rule can comprise a non-terminal, followed by the '::=' symbol, followed by a list of terminals and/or non-terminals. One non-terminal can be designated the "start non-terminal."

Even with the tags in place, the number of test cases is often too large to generate. The generation tool may run for a long time, fail to terminate, and/or terminate abnormally without a useful error message. There may be no efficient way to determine which grammar rules and/or tags are causing the problem. The tester may be forced to perform trial and/or error, guessing which grammar rule and/or tag is causing the problem and/or what kind of change will solve it. Often the trials may run for a long time before producing a result, making the process too time consuming for practical testing.

At block 302, one or more test case attributes are determined according to the grammar associated with the initial set of test cases. In an embodiment, each grammar may represent a set of objects defined by a step-by-step generation scheme called a "derivation." A derivation begins with the start non-terminal. In each step, a non-terminal N can be selected and/or a rule R selected with N on the left hand side. N can be replaced with the list of terminals and/or non-terminals on the right hand side of R. A derivation can be complete when no more non-terminals remain. Each list of terminals which can be derived from a grammar is called a "string in the language defined by the grammar." Accordingly, the one or more test case attributes can include an identification of a number of test cases that would be derived from the current testing grammar. Additionally, the one more test case attributes can also include a grouping of test cases that would be derived from the current grammar. The groupings can be selected according to common subject matter, values, rules, or other identifiers, that allows the application of organization criteria to the set of test cases that would be derived from the current grammar. By way of example, assume the testing framework 120 is analyzing a grammar that can be derived into a set of test cases that generate data packets sent to the system under test 130. Additionally, assume that the data packets can be characterized according to a specific communication protocol (e.g., IPv4 vs. IPv6). In accordance with block 304, in the illustrative example, the testing framework 120 can analyze a grammar that would be derived to generate various test packets and organize the test cases according to the communication protocol of the resulting data packets.

In an illustrative embodiment, the testing framework can obtain information from the testing grammar about a resulting set of test cases without requiring the generation and processing of the test cases. Illustratively, the testing framework 120 can analyze the testing grammar to determine a number of test cases that would be generated from the grammar and to further organize the test cases according to organization criteria. Specifically, the testing framework 120 can first search the testing grammar by traversing the language tree of the grammar to identify all terminal strings. Because the terminal strings in the grammar correspond to the test cases, the testing framework 120 can identify the number of test cases by identifying terminal strings within the testing grammar. Additionally, by further analyzing the terminal strings to identify the same, or similar, terminal strings within a grammar, the testing framework can further group the set of test cases to be generated. Accordingly, with reference to the above example, the testing framework 120 can identify the number of test cases corresponding to each data packet communication protocol by analyzing and further processing the terminal strings with a grammar to identify, for each communication protocol, the number of test cases.

At decision block 306, a test is conducted to determine whether the test cases should be modified. With reference to the previous example, in an illustrative embodiment, a user, or system administrator, may determine that the set of test cases may have too many test cases relating to a specific communication protocol. Accordingly, the underlying grammar may be modified to increase the number of test cases as to other communication protocols or eliminate the number of test case for the specific communication protocol. In an illustrative embodiment, the results of the analysis at block 304 may be presented to a user via a graphical user interface. In other embodiments, the results of the analysis may be processed automatically by the testing framework 120 according to preconfigured criteria.

Figure 4:
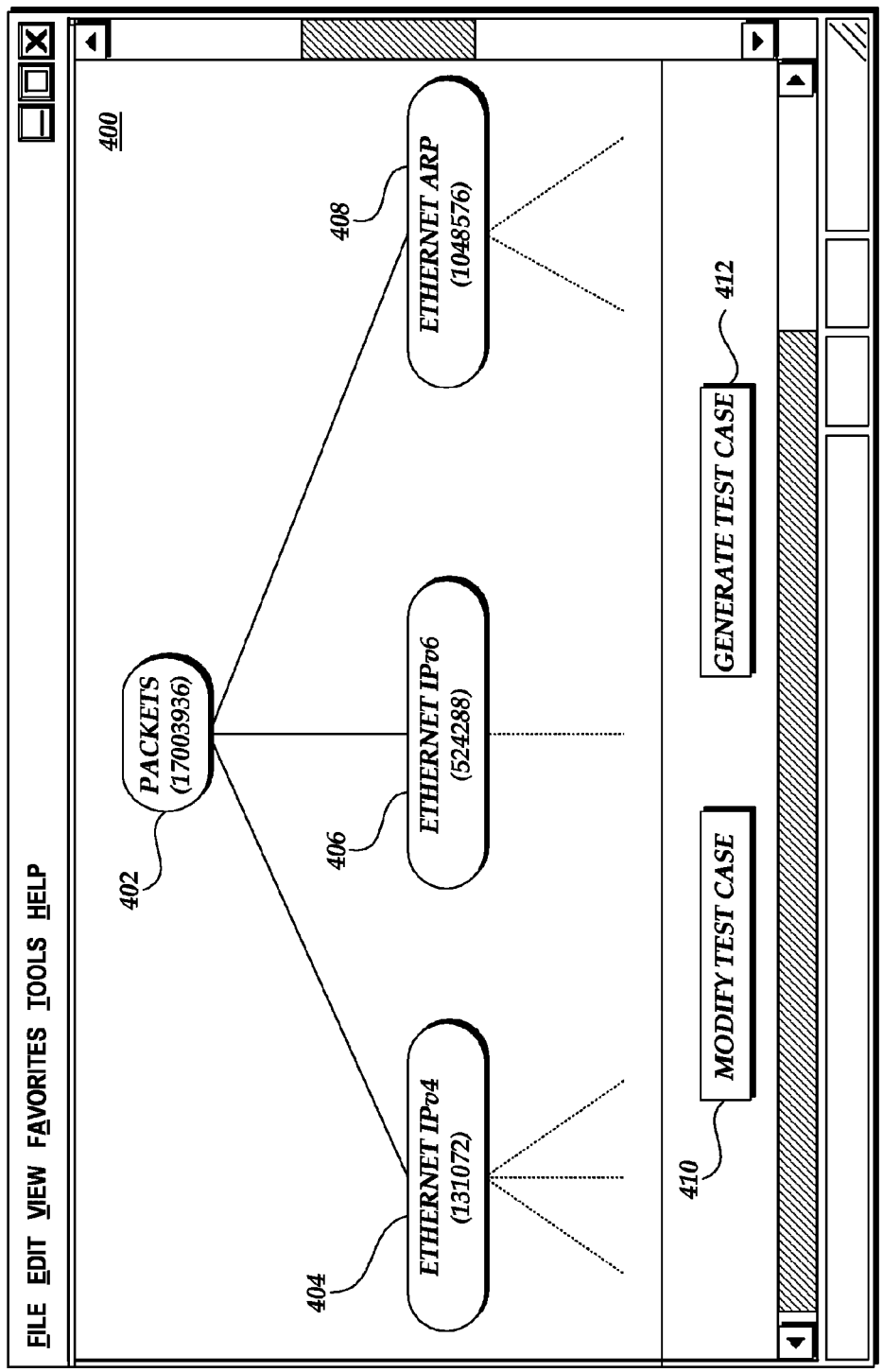
FIG. 4 is a diagram illustrative of a screen display generated by a computing device indicative of an analysis of a testing grammar corresponding to a set of test cases to be implemented by a testing framework.

With reference now to FIG. 4, an illustrate screen display 400 for presenting the results of a grammar analysis will be described. In an illustrative embodiment, the screen display can be generated as part of the client application 110. The screen display 400 is illustratively organized as a hierarchical grouping of test cases corresponding to test cases that result in the generation of data packets to the system under test 130. Examples of hierarchical groupings include derivation trees and estimator trees. The top node of the hierarchy 402 identifies that the test cases correspond to data packets and includes a total number of data packets resulting from the test cases, e.g., 17003936. One skilled in the art will appreciate that the total number represent that the total number of leaf nodes that utilize node 402 as a parent node. The screen display also includes a second level of the hierarchy that includes three nodes 404, 406 and 408 corresponding to subsets of the top node 402. In this example, node 404 further defines data packets corresponding to a first communication protocol, e.g., Ethernet IPv4, node 406 further defines data packets corresponding to a second communication protocol, e.g., Ethernet IPv6, and node 406 further defines data packets corresponding to a third communication protocol, e.g., Ethernet ARP. Nodes 404, 406, 408 also identify the number of data packets in each node. Although only a two-level hierarchy is display with regard to screen display 400, one skilled in the relevant art will appreciate that any number of levels may be displayed. Additionally, alternative display formats or views may also be incorporated.

In an illustrative embodiment, the screen display 400 can also present user controls for eliciting additional action based on the displayed analysis, explained below with regard to block 308 (FIG. 3). As illustrated in FIG. 4, the screen display 400 can include a control 410 for allowing a user initiate the manual modification of the grammar. For example, a user can be allowed to select which nodes of the hierarchy are to be included (or excluded) from the set of test cases. The screen display 400 can also include another control 412 for initiating the set of test cases from the analyzed testing grammar. In alternative embodiments, the screen display 400 can incorporate additional functionality for further processing the analyzed testing grammar. For example, nodes 402-408 may be selectable display objects that are interpreted by the testing framework 120 as modifications to the current testing grammar, either by inclusion or exclusion.

Returning to FIG. 3, if at decision block 306, a determination is made to modify the set of test cases, at block 308, the current testing grammar is modified. In an illustrative embodiment, grammars can be modified by the inclusion, exclusion or modification of tags associated with the testing grammar. For example, a tag or attribute may be applied to a grammar to limit the set of test cases that would otherwise be generated in accordance with the grammar. The modification of the current grammar may be accomplished via textual editing of the grammar tags, manipulation of display objects corresponding to the grammar tags, and the like. As discussed above, the testing framework 120 may also modify the current testing grammar automatically based on results of the analyzed grammar.

As illustrated in FIG. 3, upon modification of the current testing grammar at block 308, the routine 300 returns to block 304. In an illustrative embodiment, the testing grammar can be iteratively modified a number of times. As discussed above, the modification can be achieved without the requirement of the generation and processing of the set of test cases for each iteration. Returning to decision block 306, if a determination is made to not modify the set of test cases, the routine 300 terminates at block 310 with the generation of the set of test cases.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for testing of control devices, the system comprising:
 a computer memory that stores a testing grammar that describes a set of test cases for a device under test, wherein the testing grammar comprises one or more tags including at least one of a terminal symbol and a non-terminal symbol; and
 a processor that:
  determines at least one of a number of a set test cases that would be generated based on the one or more tags within the testing grammar and a description of the set of test cases that would be generated based on the one or more tags within the testing grammar without generating the set of test cases from the testing grammar; and
  responsive to the determination of the at least one of the number and the description of the set of test cases, generates a set of test cases for the device under test based on modification of at least one tag in the testing grammar.

2. The system as recited in claim 1, wherein the set of test cases corresponds to the generation of data packets corresponding to interne control message protocol messages.

3. The system as recited in claim 1, wherein the set of test cases corresponds to the generation of strings.

4. The system as recited in claim 1, wherein the processor determines at least one of the number and the description of the set of test cases by searching the grammar and identifying each instance of a terminal symbol.

5. The system as recited in claim 4, wherein the processor further categorizes the terminal symbol according to a set of predetermined categories.

6. A system for testing computing devices, comprising:
 one or more computer processors;
 at least one computer memory accessible by at least one of the one or more computer processors;
 a client application component executed by at least one of the one or more computer processors for generating control instructions for a device under test, wherein the control instructions describe an initial set of test cases for the device under test; and
 a test case generation component executed by at least one of the one or more computer processors for:
  obtaining the generated control instructions from the client application component,
  analyzing the control instructions to determine at least one attribute of the initial set of test cases described by the control instructions for the device under test,
  generating modified control instructions using the determined attribute of the initial set of control instruction,
  transmitting the second set of test cases to the device under test, and obtaining at least one output generated by the device under test, wherein the at least one output generated by the device under test is responsive to the second set of test cases described by the modified control instructions;

wherein control instructions are analyzed without generation of the initial set of test cases.

7. The system as recited in claim 6, wherein the control instructions correspond to a test grammar.

8. The system as recited in claim 7 wherein the test case generation component is further operative to generate the second set of test cases from the test grammar.

9. The system as recited in claim 8, wherein the test grammar includes a set of attributes.

10. The system as recited in claim 9, wherein the test case generation component generates the second set of test cases based on processing the attributes in the test grammar.

11. The system as recited in claim 6, wherein the test generation component searches the grammar to identify data indicative of a test case to be derived from the grammar.

12. The system as recited in claim 11, wherein the data indicative of a test case to be derived from the grammar corresponds to a terminal symbol defined in the grammar.

13. The system as recited in claim 11, wherein the at least one attribute of the set of control instructions corresponds to an attribute specified in the grammar.

14. The system as recited in claim 6, wherein the at least one attribute of the initial set of test cases includes at least one of a number of test cases in the initial set of test cases and description of test cases in the initial set of test cases.

15. A method for testing comprising:

obtaining a testing grammar that describes a target set of test cases to be applied to a system under test, wherein the testing grammar identifies a set of parameters utilized in the generation of the target set of test cases;

determining one or more attributes of the target set of test cases that would be generated based on the set of parameters identified by the testing grammar without generating the target set of test cases from the testing grammar; and generating a modified set of test cases from the testing grammar according to the determined one or more attributes of the target set of test cases.

16. The method as recited in claim 15, wherein determining one or more attributes of the target set of test cases that would be generated based on the set of parameters identified by the testing grammar without generating the target set of test cases from the testing grammar includes searching the testing grammar for terminal symbols.

17. The method as recited in claim 15, wherein determining one or more attributes of the target set of test cases that would be generated based on the set of parameters identified by the testing grammar without generating the target set of test cases from the testing grammar includes associating at least one element in the grammar with a predetermined category.

18. The method as recited in claim 15 further comprising:

prior to generating the modified set of test cases, identifying one or more attributes of the modified set of test cases from the modified testing grammar without generating the modified set of test cases from the modified testing grammar;

modifying at least one additional parameter from the set of parameters identified by the testing grammar based on the identified attributes of the modified set of test cases.

19. The method as recited in claim 15 further comprising generating a user interface corresponding to the identified one or more attributes of the target set of test cases that would be generated based on the set of parameters identified by the testing grammar without generating the target set of test cases from the testing grammar.

20. The method as recited in claim 19, wherein generating a modified set of test cases from the testing grammar includes modifying the at least one parameter based on input received from the user interface.

* * * * *